US012231463B2

(12) United States Patent
Schmauch et al.

(10) Patent No.: US 12,231,463 B2
(45) Date of Patent: Feb. 18, 2025

(54) CONTENT-BASED SOCIALLY-ENGINEERED THREAT CLASSIFIER

(71) Applicant: Proofpoint, Inc., Sunnyvale, CA (US)

(72) Inventors: Cameron Michael Schmauch, Los Gatos, CA (US); Chaitanya Puchakayala, San Jose, CA (US)

(73) Assignee: PROOFPOINT, INC., Sunnyvale, CA (US)

( * ) Notice: Subject to any disclaimer, the term of this patent is extended or adjusted under 35 U.S.C. 154(b) by 257 days.

(21) Appl. No.: 17/693,157

(22) Filed: Mar. 11, 2022

(65) Prior Publication Data

US 2023/0291764 A1    Sep. 14, 2023

(51) Int. Cl.
*H04L 9/40* (2022.01)
*G06F 40/211* (2020.01)

(52) U.S. Cl.
CPC ........ *H04L 63/1483* (2013.01); *G06F 40/211* (2020.01); *H04L 63/1416* (2013.01)

(58) Field of Classification Search
CPC ............. H04L 63/1483; H04L 63/1416; G06F 40/211; G06F 40/205
See application file for complete search history.

(56) References Cited

U.S. PATENT DOCUMENTS

| | | |
|---|---|---|
| 2015/0163242 A1 | 6/2015 | Laidlaw et al. |
| 2016/0234240 A1 | 8/2016 | Dietrich et al. |
| 2017/0230408 A1 | 8/2017 | Ahmed et al. |
| 2017/0330102 A1 | 11/2017 | Brush |
| 2019/0104152 A1 | 4/2019 | Boutnaru |
| 2020/0234109 A1* | 7/2020 | Lee .................... G06N 3/08 |
| 2022/0038490 A1* | 2/2022 | Thakur ................ G06N 3/044 |
| 2022/0124114 A1* | 4/2022 | Assiry ................. H04L 63/10 |

OTHER PUBLICATIONS

International Search Report and Written Opinion issued by the U.S. Patent and Trademark Office as the International Searching Authority (USPTO/ISA) for International PCT Application No. PCT/US23/64178, mailed Jun. 27, 2023, 11 pages.
International Preliminary Report on Patentability for International PCT Application No. PCT/US23/64178, mailed Sep. 26, 2024, 7 pages.

* cited by examiner

*Primary Examiner* — Sangseok Park
(74) *Attorney, Agent, or Firm* — Sprinkle IP Law Group

(57) ABSTRACT

Threat detection systems and methods in which feature syntax language (FSL) statements are used to define functions that generate features corresponding to detected text within textual non-attachment, non-URL input data. Generated features are aggregated in a core object, and classification rules are applied to the core object to determine a threat classification and theme associated with the input data. Using FSL statements and classification rules enable the system to rapidly generate thematic threat classifications identifying socially engineered attacks. A user interface enables users to rapidly update the FSL statements that define the functions used to generate the features, as well as the threat classification rules that are applied to the features in the core object to classify the input data. The modified statements and rules can be immediately used by the system.

20 Claims, 5 Drawing Sheets

CONTENT-BASED SOCIALLY-ENGINEERED THREAT CLASSIFIER

TECHNICAL FIELD

This invention relates generally to cybersecurity, and more particularly to systems, methods, and computer program products for identifying features of various different types of content and classifying thematic attacks that are detected in the body of the content rather than attached files or linked resources.

BACKGROUND

Cyberthreat protection technologies are often used to protect enterprise computing networks from attacks and threats originating from malicious or otherwise suspicious sources. For instance, email communications are commonly examined to determine whether they include attachments or universal resource locator (URL) links which are considered to be malicious or "bad" (e.g., which are identified as malware, phishing, spam, etc.)

Commonly, attachments or URLs in emails are identified and then scanned to determine whether they should be deemed threats (i.e., to perform threat classification). The threat classification processes for attachments and emails are typically separate. In other words, scanning attachments will require a first process using a specific threat detection engine, while scanning URLs requires a different process using a different threat detection engine. Other types of data may also be scanned for threats using corresponding (and different) threat detection engines.

The processes and threat detection engines configured to scan the different types of data typically use unique components. There generally is no crossover between the threat detection domains, and for each different type of data to be scanned, a different threat detection engine must be built. The need to build different classifiers for each different type of data is inefficient and time consuming. Additionally, the classifiers are commonly based on machine learning systems, which may take a considerable amount of time to scan the suspicious data and to generate a threat classification. Still further, machine learning systems require a great deal of time to update, as they rely on processing and analysis of many items to generate adjustments to the weights used to generate their threat classifications.

It would therefore be desirable to provide improved techniques and systems for rapid identification of threats (e.g., threat emails), as well as techniques to enable updates and modifications to the threat detection systems and processes.

SUMMARY

Embodiments of the invention address these problems by providing a threat detection system, or threat classifier, that uses feature syntax language (FSL) statements to define functions that generate features corresponding to detected text within the textual input data (aside from attachments and linked URLs) that is provided to the classifier. The generated features are aggregated in a core object corresponding to the input data. A set of classification rules which define thematic threat classifications based on the features contained in the core object are applied to the core object to generate a threat classification corresponding to the input data represented by the core object.

The classification of the input data through the use of the FSL statements and threat classification rules enable the system to rapidly generate thematic threat classifications that identify socially engineered attacks, which is beyond the capability of conventional systems that identify traditional attacks in which a user clicks on a link or opens an attachment. Further, the FSL statements that define the feature-generating functions can be easily modified (e.g., to change existing functions, add new functions, etc.) by a user, and the modified functions can be immediately used by the system, in contrast to existing systems which may require a considerable amount of time to adapt processes that are based on machine learning techniques, and which may not be easily adapted to detect specific attacks that are identified by analysts. Similarly, the classification rules can be modified by a user and immediately applied. Thus, the present embodiments not only rapidly generate features and thematic threat classifications, but also enable users to rapidly adapt the system to recently identified features, patterns, or threats.

One embodiment comprises a system for identification of threats in input content. This system includes a feature syntax language (FSL) statement database which is configured to store statements that define functions, each function adapted to generate a corresponding feature responsive to detecting corresponding text in a content item. The system also includes a core object generator which is adapted to receive an input content item, apply the functions stored in the FSL statement database to the input content item and generate a resulting set of features corresponding to the input content item, and generate a core object containing the set of features corresponding to the input content item. The system has a classifier engine coupled to receive the core object from the core object generator, where the classifier engine is adapted to retrieve rules from a rules database and to apply the rules to the received core object. This enables the classifier engine to provide real-time identification of threats corresponding to the core object according to the applied rules. The system also includes a user interface which is coupled to the FSL statement database and the rules database. The user interface is adapted to receive user input to modify the statements in the FSL statement database and the rules in the rules database. The system can then use the modified statements and rules in real-time.

In some embodiments, the user interface is adapted to update the FSL statement database based on the received user input in real-time, and the core object generator is adapted to apply the functions of the updated FSL statement database in real-time. Updating the FSL statement database may comprise adding one or more statements to the FSL statement database, where each of the added statements defines a corresponding added function, each added function corresponding to an additional feature. In some embodiments, the user interface is coupled to the rules database and is configured to update the rules database in real-time based on rules input received via the user interface. The classifier engine is adapted to apply the updated rules in real-time to the received core objects.

In some embodiments, the core object generator is adapted to receive a plurality of different content item types, the core object generated by the core object generator being type-agnostic. The generated features and core objects corresponding to the detected text are the same, regardless of the type of the input content.

In some embodiments, the classifier engine comprises a match engine which is adapted to compare the set of features of the core object to the retrieved rules and to identify matches between the set of features and the rules. The match engine may be adapted to generate a list of the rules that match the core object. The match engine may be coupled to a category precedence ordering module which defines precedence of a plurality of threat categories, the match engine ordering the list of the one or more rules that match the core object according to the defined precedence of the plurality of threat categories. The classifier engine may provide a labeled core object as output, the labeled core object containing the core object and the ordered list of the one or more rules that match the core object. The system may further comprise a core object database which is configured to store the labeled core object.

In some embodiments, the system stores named sets, where each named set contains a set of alternative terms. The named sets can be included in the statements in the FSL statement database and/or the rules in the rules database, so that when user input modifying the named sets is received, the system modifies the named sets according to the input and uses the modified named sets in real-time in applying the FSL statements and rules.

In some embodiments, the classifier engine is adapted to identify threats comprising thematic attacks, where the thematic attacks are identified independent of attachments and URLs associated with the input content item. The classifier engine may also be adapted to identify a specific theme associated with the input content item. The classifier engine may also be adapted to generate a thematic classification and to associate the thematic classification with the core object. Further, the system may be adapted to perform an analysis of an attachment to the input content item and/or a URL contained in the input content item, where the system generates a second classification based on this analysis.

An alternative embodiment comprises a method in which statements that define a plurality of functions are stored in a feature syntax language (FSL) statement database, each function being adapted to generate a corresponding feature responsive to detecting corresponding text in a content item. A core object generator then receives an input content item and applies the functions stored in the FSL statement database to the input content item. The core object generator generates a set of features resulting from application of the functions stored in the FSL statement database to the input content item, where the set of features correspond to the input content item. The core object generator then generates a core object containing the set of features corresponding to the input content item. A classifier engine receives the core object from the core object generator, retrieves a set of rules from a rules database, and applies the rules to the received core object to provide real-time identification of threats corresponding to the core object according to the applied rules.

The method may include receiving, via a user interface coupled to the FSL statement database and the rules database, user input to modify the statements in the FSL statement database and/or the rules in the rules database. The modified statements and rules can then be applied by the core object generator and the classifier engine in real-time.

The method may also include updating the FSL statement database based on the received user input in real-time and applying the functions of the updated FSL statement database in real-time. Similarly, the method may include updating the rules database in real-time based on rules input received via the user interface and applying the updated rules in real-time to the received core object.

The method may also include storing one or more named sets, each of which contains a set of alternative terms, where the named sets are included in at least one of the statements in the FSL statement database or the rules in the rules database. When user input modifying one or more of the named sets is received, the named sets are modified, and the modified named sets are used in real-time.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
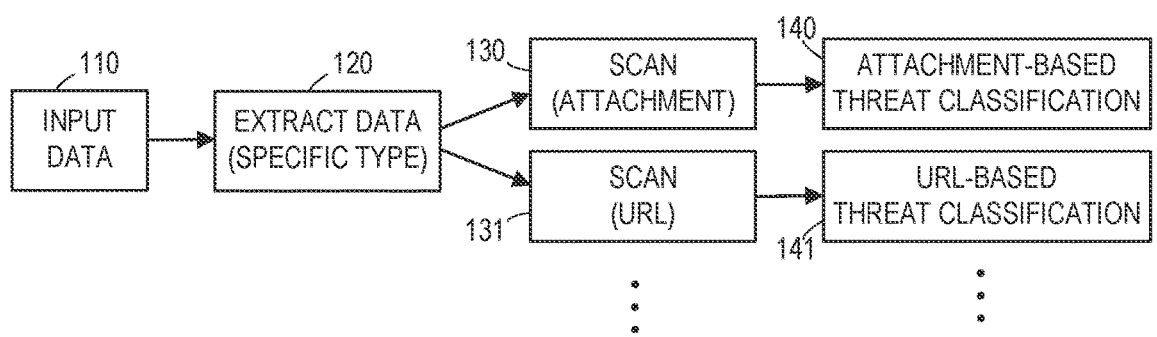
FIG. 1 is a block diagram illustrating, at a high level, the processing of emails or other data to identify corresponding threats in accordance with the prior art.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent/to those skilled in the art from this disclosure.

Embodiments of the present invention are adapted to provide rapid identification of threats in emails or other types of input data based on thematic analysis of the data. The thematic analysis is not based on conventional scans of files that are attached to an email or data, or URLs that are linked to the email/data, but is instead based on text-based "tells" which indicate that the email or data is, or may be, a socially engineered attack.

It should be noted that the embodiments of the invention disclosed herein may perform analysis and classification of various different types of data including, for example, emails, JSONs, comma-separated-value (CSV) files, text files, HTML files, and others. Some embodiments are particularly well-suited to classifying emails containing text-based fraud spam messages. Examples herein may therefore focus on the identification and classification of threat emails because, however, the disclosed techniques and systems can process types of data other than emails, references to "emails" in these examples should be widely construed to include the processing of other types of data.

The threat classification that is performed by the embodiments disclosed herein may use a combination of tells. These tells may include, for example, text-based tells in the body of an email, such as particular phrases, words, spellings, odd punctuation or grammar. The tells may also include header-based tells such as mismatched from/reply-to addresses, mismatched to/from identifiers, executive impersonation, look-alike domains, etc. which are attributes that are commonly exhibited by attackers' methods of operation. Further, thematic-based tells such as gift cards, quick tasks, payroll redirection in similar coarse-grained themes encapsulating lures and commonly used strategies of attackers may be taken into account.

Embodiments disclosed herein are designed to enable the classification of emails or other data based on these tells. These embodiments generate, using a set of feature syntax language (FSL) statements, features which are representative of the tells and aggregate the features in core objects corresponding to the emails/data. The features of each core object are analyzed using a set of classification rules to identify thematic attacks, which may include, for example, spearfishing attacks leveraging social engineering tactics, and scam emails (e.g. "419" or "Nigerian prince" scam emails). The generation of the features based on the identified tells and the processing of these features in the core object enable the rapid classification of the emails and identification of corresponding theme-based attacks. Further, an analyst or other user can easily modify the statements that are used to generate the features, as well as the rules that are used to classify the generated feature sets in the core objects, with the modifications being immediately applied in the processing of subsequent emails.

Before describing exemplary embodiments of the invention in detail, it may be helpful to briefly give an overview of threat identification processing that is performed in existing systems. Referring to FIG. 1, a functional block diagram showing, at a high level, the processing of emails or other data to identify corresponding threats is shown. In this example, input data 110 such as an email is received by the system, and the data is processed by a parser 120 which identifies components of the data to be further processed for threat identification purposes. In some embodiments, an email which is input to the system may include file attachments or links to URLs. Other components of the email/data may also be identified and/or extracted.

In this example, an attachment to the email is extracted and is provided to a scan engine 130 which is specifically configured to scan attachments to determine whether they include malicious or otherwise undesirable content (e.g., executable code that includes malware). Attachment scanning engine 130 scans the received attachment to determine whether or not the attachment is undesirable and generates a corresponding threat classification 140 for the attachment.

In addition to identifying and extracting attachments from the received email, parser 120 may also extract links to URLs. Attachment scanning engine 130 is configured specifically to process attachments, and is not suited for processing of URLs. Consequently, the system includes a separate URL scanning engine 131 which is specifically configured to examine URLs and to determine whether they are malicious or otherwise undesirable. URL scanning engine 131 generates a threat classification 141 for the URL which is separate from any threat classification (e.g., 140) which is generated for an attachment to the email.

Just as separate scanning engines (130, 131) are provided to separately examine and identify attachments to emails and URLs linked to emails, various other types of threats. The system may also be configured to identify threats in types of input data such as JSONs, text, comma-separated-value files, HTML files, etc. for each of these different types of input data, the system will have a separate scanning engine. These different scanning engines normally cannot reuse components of other scanning engines, as the components are typically designed specifically to be used in the detection of threats in the corresponding type of input data. Thus, if it is desired to enable the system to identify threats in a new or different type of input data, it is necessary to build a new scanning engine designed specifically for this type of input data, which requires considerable time and expense.

It should be noted that the diagram of FIG. 1 provides a very high level view of the threat detection system, and the blocks identified in the figure may contain numerous subsystems or components which may vary from one system to another. The specific subsystems/components that may be used are not discussed here, as they are not important to the discussion of the present invention.

Existing threat classifier systems such as these may have a number of drawbacks. For example, current threat classifiers primarily focus on embedded URLs and attachments. These systems do not focus on socially engineered threats in the email or other content that initiate recipient engagement, such as a request to send money, personal information, credit card or bank account information, and the like.

Existing threat classifiers generally analyze embedded URLs and attachments by applying classification rules using machine learning techniques to determine threats. These existing classifiers build and update machine learning models using techniques that require running many URLs and/or attachments through the system in order to update the update the classifier to learn new and different attacks in the attachments and/or URLs. It can often take a significant amount of time to update the model and classification rules to enable the new attacks or threats to be identified. This same lengthy process must be used to build or update separate classifiers for any additional types of input content to be analyzed.

Different classification engines that are tasked with classifying emails each have their own unique ways of being managed. Thus, systems using these different engines require tuning to keep the engines up to date. Additionally, each classification approach cannot be extended to other "domains." For example, engines that are designed to analyze a first kind of input data (e.g., "URLs" embedded in emails) are limited to analyzing that particular type of raw data. This first type of engine could not be used to analyze attachments to emails. A second, different engine would be required to analyze this type of data.

Still further, the output of the different classifiers that are used in existing systems cannot currently be "combined" and analyzed together to provide a more robust analysis and classification tool. In other words, there is no mechanism to allow for the results of a first classification engine to be combined with the results of a second classification engine to provide a "composite" classification that would be more accurate than either individual result.

The present embodiments are intended to overcome a number of the shortcomings of existing systems by using functions defined in FSL statements to identify relevant text within input data (e.g., in the body or header of an email) and to generate features corresponding to the identified text. These features are aggregated into a core object which can be examined (e.g., compared to a rule set) to identify threats within the input data based on the identified features. The use of the cell statements and the rule sets provide a means to rapidly identify threats based on tells indicated by the features of the core object. Additionally, an analyst or other user can easily and rapidly update the FSL statements and rule set to modify the feature detection and rules which are applied by the system to identify the threats.

The FSL-based classifiers disclosed herein are "non-URL/attached file scanning" classifiers that classify content (e.g., emails) with "thematic" types of threats typically based on engagement with the recipient (social engineering) instead of clicking on a URL or an attached file. In addition to identifying thematic attacks generally, these classifiers can analyze generated "features" to identify the specific "theme" of the attack. For example, it may be a "gift card" lure, a financial information request, etc. In other words, these classifiers can identify a threat email and then "map" the threat to a particular "theme" of the threat, which can be presented through a user interface to the customer.

The FSL-based classifier uses feature syntax language statements which define functions that act upon input content to generate "features" of the email. The input content may be email content, JSONs, text, comma-separated-value files, HTML files, or various other types of content. The functions defined by the FSL statements generate "features" from input content (emails, JSONs, etc.). If a particular feature is generated by the FSL statements, the feature is the same, whether it is generated from one type of input content or another. The features can therefore be considered input-agnostic or type-agnostic. The features generated by the FSL for the input content are then rolled up or aggregated into "core objects" corresponding to the input content. This core object is then acted upon by a set of classification rules (a ruleset) to identify threats. The classification rules analyze the features in the core object to identify threats in the input content.

In some embodiments, the FSL-based classifier reviews the input content for: 1) text-based tells in the body of the content (for phrases/words/spelling/grammar), 2) header-based tells (e.g., mismatched to/from in an email, executive impersonation, etc.) and 3) thematic-based tells (e.g., coarse grained themes or lures, such as gift cards, payroll/payment redirection, etc.). The FSL-based classifier can identify socially engineered attacks which can supplement the threat identification capability of existing threat identification products such as traditional threat classifiers that focus on URLs and attachments.

The FSL-based classifier enables rapid (e.g., real-time) identification of new threats by allowing analysts to write/add statements to the FSL statement database, where the statements define functions that identify new features. This will result in input content (e.g., emails) containing those features being identified as threats by the classification rules. The analysts can base the new FSL statements (and corresponding new features) on their analysis of, for example, 1) text based tells (e.g., phrases, words, spelling, and/or grammar of the input content), 2) header based tells (e.g., mismatched to/from, executive impersonation, etc.) and 3) thematic based tells. This update to the FSL statements to identify new features can be done by analysts without the time delay associated with existing machine language-based classification rule development systems.

A unique framework for the FSL-based classifier provides a solution to the problem of existing classification approaches not being extendable to other domains. It does so by providing the capability to not only analyze email content to identify features using the FSL statements, but also to analyze other content (e.g., URLs, attachments, etc.) due to the unique way the framework consumes incoming data and generates features that are aggregated in core objects for analysis.

The core objects generated in the present embodiments can be analyzed to create new classification rules, which allows threats to be identified more rapidly. In other words, by analyzing the core objects as they are created, the FSL-based classifier can create new classification rules and detect previously unknown patterns more quickly. This can be done much faster than traditional machine learning model rule creation (which requires many cycles and numerous emails (or other input content) with similar threats in order to update the corresponding classification rules. Additionally, because the FSL-based classification rules are applied to core objects rather than specific types of input content, applying the rules to the core objects can identify threats in various different types of input content, rather than being limited to a specific type (e.g., emails alone). This allows for a flexible mechanism (enabled by FSL-generated features and core objects) that can develop new classification rules more rapidly (e.g., in days instead of months), enabling more rapid detection of threats (particularly, threats that are thematic in nature).

Some embodiments may use different threat classification tools (e.g., a classifier that act on URLs embedded in emails) in conjunction with the FSL-based classifier. These embodiments may use an engine that does not produce core objects to analyze embedded URLs, but the output of the URL classifier can be processed as an input to the FSL-based classifier to generate a set of features that are rolled up into a core object. The output of the FSL-based classifier (i.e., the core object) can then be combined with the output of the URL classifier to create a composite core object. The composite core object can then have classification rules run against it in the FSL-based classifier framework to provide a composite analysis.

Figure 2:
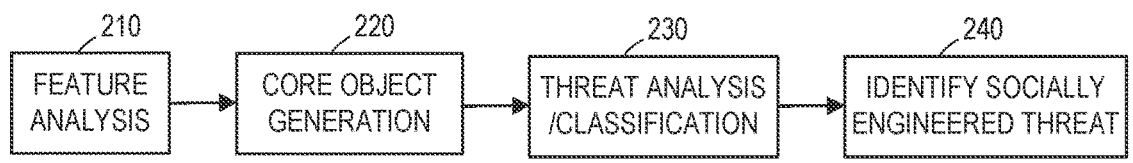
FIG. 2 is a block diagram illustrating the primary functions of a threat identification system configured to operate based on tells in the input content in accordance with some embodiments.

Referring to FIG. 2, a diagram is shown to illustrate the primary functions of a threat identification system configured to operate based on tells in the input content in accordance with some embodiments. As depicted in this figure, the system first performs feature analysis 210 wherein tells in the input content or examined to identify corresponding features of the content. A core object is then generated 220 based on the identified features. The features in the core object are analyzed 230, and corresponding thematic threats corresponding to the input content are identified 240.

Figure 3:
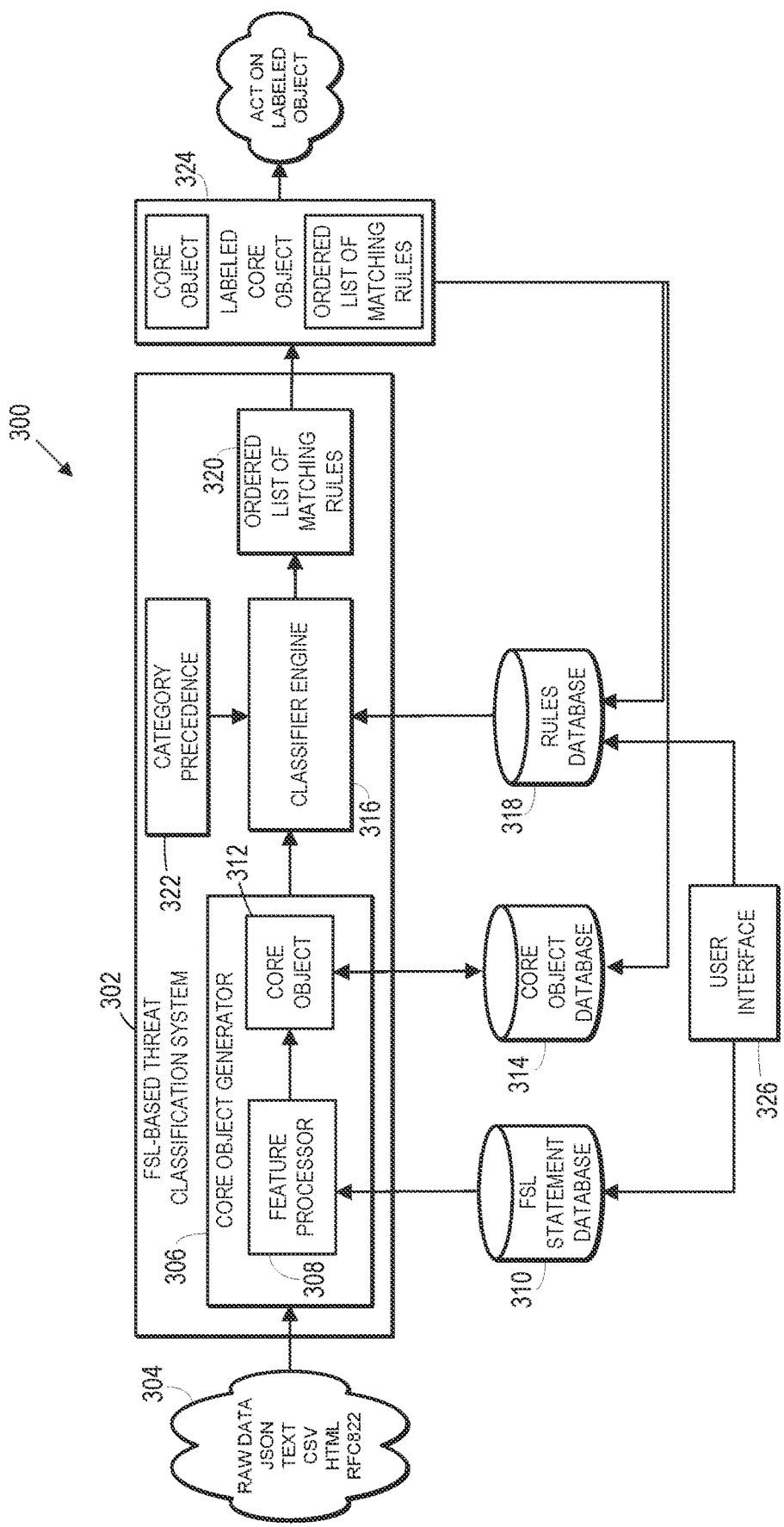
FIG. 3 is a block diagram illustrating the framework of an exemplary FSL-based threat identification system in accordance with some embodiments.

Referring to FIG. 3, a diagram illustrating the framework of an FSL-based threat identification system in accordance with some embodiments is shown. In this example, system 300 has a classifier 302 which is configured to receive input content 304. Input content 304 may be any of a variety of different types of input content, such as emails, text, JSONs, CSV files, HTML files, and the like. Each of these different types of input may be received and processed by the same system components, which will be described in more detail below.

Input content 304 is received by parser 306, which extracts the content to be examined from the received data. In one embodiment, an email is received, and the parser 306 extracts the body of the email, as well as headers and similar information. While the extracted information may include information such as the label for a URL, the system is not configured in this embodiment to examine the linked URL itself. Similarly, the system is not configured in this embodiment to analyze files which are attached to the email.

The data extracted by parser 306 is provided to feature processor 308. Feature processor 308 retrieves FSL statements from a database 310 and applies the statements to the text of the input content. Each statement defines a function for generating features corresponding to identified text in the input content. The features that are generated for the input content by the functions of the stored FSL statements are aggregated in a core object 312 which corresponds to the input content. In this embodiment, the core object is stored in a core object database 314.

The generated core object 312 is provided to a classifier engine 316. Classifier engine 316 is configured to retrieve a rule set from rules database 318 and to apply the retrieved rule set to the core object. The rules in the rule set identify threats that may be detected in the input content based on the features that are contained in the corresponding core object. Classifier engine 316 may be configured to, for example, match the rules to the features of the core object and to identify the rules that match the core object's features.

In this embodiment, classifier engine 316 then generates a list 320 of the rules in the rule set that match the features of the core object. Classifier 316 may maintain a list of categories and an order of precedence of the categories which is used to order the list of rules that are determined to match the retrieved rule set. The list of categories may be ordered, for example, by the relative severity of the identified threat (e.g., malware, phish, spam, bulk, ham). Classifier 302 may then generate a labeled core object 324 which includes an ordered list of the matching rules.

Labeled core object 324 may then be provided to an analyst or and associated system for taking action on the identified threat associated with the core object and the corresponding input content. Core object database 314 may also be updated to store labeled core object 324. Rules database 318 may be updated to reflect the matching rules associated with the labeled core object (e.g., to update statistics associated with the rules indicating occurrences of the rules matching the core objects).

FSL-based threat identification system 300 has a user interface 326 which is coupled to FSL statement database 310 and rules database 318. In other embodiments, separate interfaces may be coupled to each of FSL statement database 310 and rules database 318. User interface 326 enables a user (e.g., an analyst) to access the FSL statements and to modify, add or delete statements, thereby modifying, adding or deleting the functions implemented by the statements and enabling feature processor 308 to detect new or modified features, or preventing previously defined features from being detected. Similarly, user interface 326 enables a user such as an analyst to access the rule set stored in rules database 318. The interface enables the user to modify existing rules, add new rules, or delete rules. Consequently, classifier engine 316 can use the updated rule set to identify new or modified threats, or to stop identifying threats corresponding to deleted rules.

The changes which are made to the FSL statements and rules can be immediately implemented by feature processor 308 and classifier engine 316 to detect features and identify threats according to the updated statements and rules. An analyst or other user can therefore identify potential features or threats, update the FSL statements and/or rules, and immediately see the effects of the updated statements/rules without having to wait for a machine learning engine to process multiple (and typically numerous) input instances and slowly update itself to adapt to these evolving threats.

Figure 4:
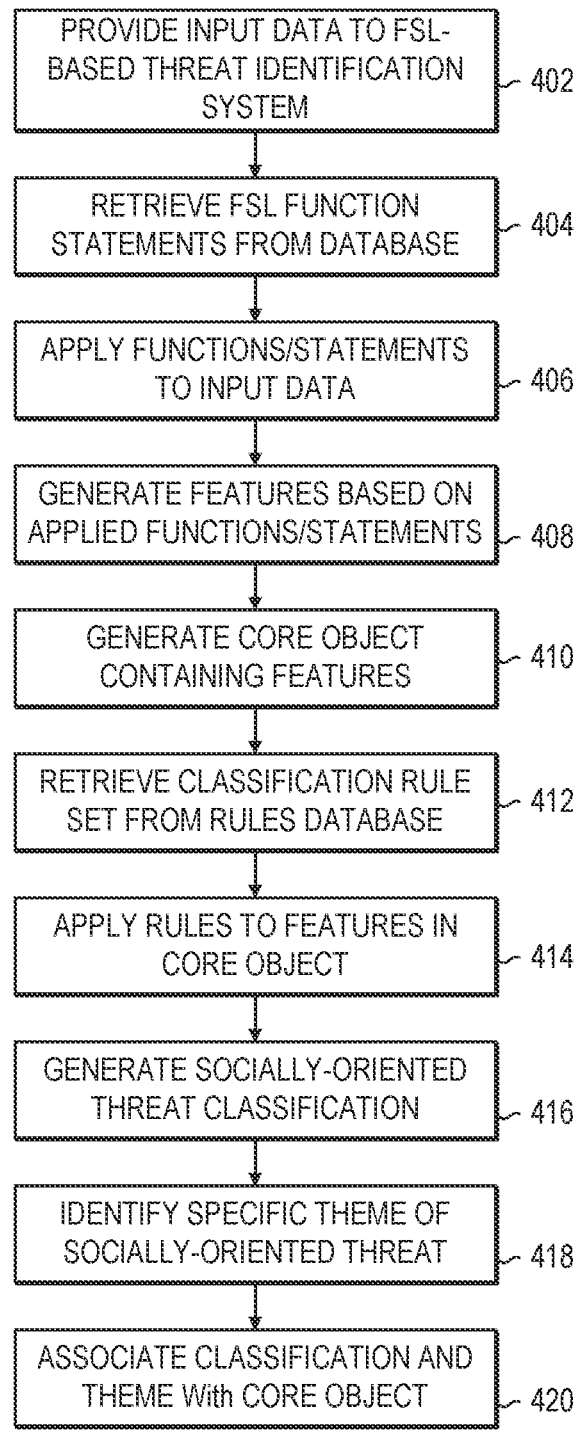
FIG. 4 is a flow diagram illustrating the operation of an FSL-based threat identification system in accordance with some embodiments.

Referring to FIG. 4, a flow diagram illustrating the operation of an FSL-based threat identification system in accordance with some embodiments is shown. At step 402, input content is provided to the threat identification system. As noted above, the input content may be any of a variety of types and in an exemplary system is an email. The threat identification system retrieves, from an FSL database, a set of FSL statements (step 404). The FSL statements, which define functions for generating features from detected text, are applied to the input content (step 406), thereby generating a set of features corresponding to the input content (step 408). The threat identification system then generates a core object corresponding to the input content, where the core object contains the features that have been generated for the input content by application of the FSL statements (step 410).

After the core object has been generated, the system retrieves from a rules database a rule set that identifies threats based on features that are detected in the input content (step 412). The retrieved rules are applied to the generated content object and the features contained in the core object (step 414) and a threat classification identifying a threat type associated with the core object is generated based on the application of the rule set to the core object (step 416). In addition to identifying the type of threat associated with the core object, the threat identification system may identify a specific theme that is associated with the threat (step 418), such as a gift card lure, payment redirection, or the like. The threat classification and theme are then associated with the core object (e.g., by storing this information with the core object) (step 420).

Figure 5:
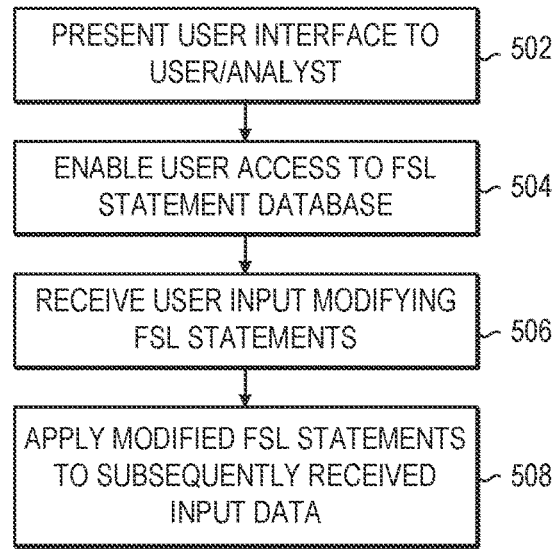
FIG. 5 is a flow diagram illustrating an exemplary method for updating an FSL statement database in accordance with some embodiments.

Referring to FIG. 5, a flow diagram illustrating an exemplary method for updating an FSL statement database in accordance with some embodiments is shown. This method allows the functions which are used by the system to generate features for the input content to be rapidly updated, and for the updates to be applied in real time (substantially immediately) to any input content which is subsequently processed by the system. In this example, a user interface is presented by the FSL-based threat identification system (step 502). The system enables access by a user (e.g. an analyst) to the FSL database storing the function-defining FSL statements (step 504). The system then receives user input via the user interface, where the user input modifies, adds, or deletes one or more statements in the FSL database (step 506). When the FSL database has been updated according to the user input, the modified set of FSL statements in the database are applied to input content which is subsequently processed by the system (step 508).

Figure 6:
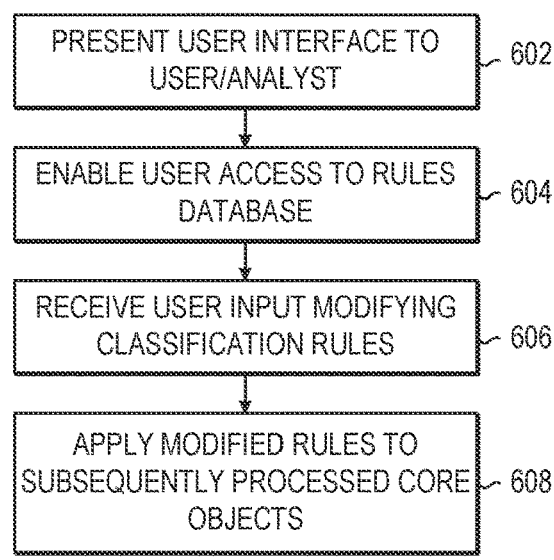
FIG. 6 is a flow diagram illustrating an exemplary method for updating a rules database in accordance with some embodiments.

Referring to FIG. 6, a flow diagram illustrating an exemplary method for updating a rules database in accordance with some embodiments is shown. Similar to the method for updating the FSL statement database, this method allows the rule set which are used by the system to generate threat classifications based on the features of a core object to be rapidly updated, and enables the updates to be implemented in real time, rather than experiencing the delays of existing systems' machine learning engines. At step 602, a user interface is presented to a user. The system enables access by the user to the rules database via the user interface (step 604). The system receives user input via the interface to modify, add, or delete rules of the rule set in the rules database (step 606). The received user input is applied to the rule set to update the rules, and the updated rule set is thereafter applied to the analysis of features in core objects to identify threats corresponding to the features (step 608). The system thus provides a means to rapidly update the rule set, and to apply the updated rules in real time.

In some embodiments, the FSL-based threat identification system is configured to use "named sets" in the function-defining FSL statements and the rule set for threat classification. Each name set contains a group of terms that can be used as alternatives for each other in the FSL statements and/or rule set. Thus, if a statement or a rule contains a particular named set, when that statement or rule is applied, it will effectively be interpreted as multiple different statements, each with a different one of the alternative terms in the named set. Thus, the group of terms identified in a named set can be updated, and the updated group of terms will be used in the FSL statements and/or rule set going forward. A user can thereby make a change to a named set, and this change will be effectively applied in each of the FSL statements and rules without having to separately or individually modify those statements and rules.

A metonym is a word that names an object from a single characteristic of it or of a closely related object. For example, calling a government "city hall" is using a metonym. It may be useful in an FSL-based threat detection system to use the concept of a metonymy to group certain regularities in relation to email compromise attacks or other aspects of detection. Metonymy attributes are meant to capture some of the more common attack strategies/themes and peculiarities, as well as aid in highlighting the significance of the attack by supporting additional information flowing into cooperating threat detection systems. Some of the more significant metonymies that are used are centered around "themes" (which have been the dominant clusters of activity of recent history):

metonymy.gift_card.ns
metonymy.invoice.ns
metonymy.payroll_redir.ns

These are simply named sets consisting of regular expressions operating on message body text. For example, here are the first several patterns in invoice:

metonymy.invoice.ns
unpaid invoice
invoice and w-9
invoice (no\.?|number|#)
urgent:? invoice
invoices? for\b
invoice\(s\)

Figure 7:
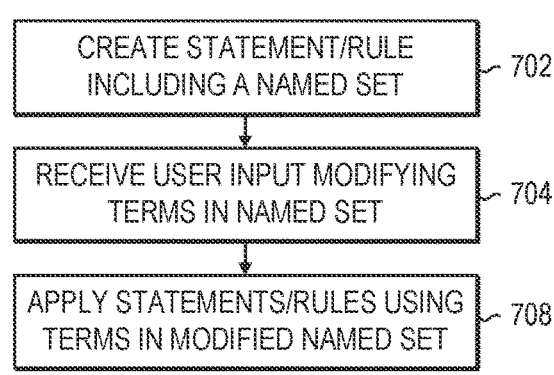
FIG. 7 is a flow diagram illustrating an exemplary method for updating FSL statements and/or rules using a named set in accordance with some embodiments.

Referring to FIG. 7, a flow diagram illustrating an exemplary method for updating FSL statements and/or rules using a named set in accordance with some embodiments is shown. In this embodiment, one or more FSL statements and/or threat identification rules using a named set are created (step 702). The named set (which is stored in a memory coupled to the system) is accessed by a user via a user interface and is updated to modify, add, or delete one or more alternative terms in the named set (step 704). After the named set has been updated, the name to set is accessed by the system when applying FSL statements and/or threat identification rules that reference the named set, and the updated alternative terms in the named set are used in the application of the statements and/or rules (step 708).

Tables 1-3 below are examples of named sets that might be used in one implementation of an FSL-based threat identification system. These tables identify alternative terms to be used in place of the named set references freemail-_common_doms.ns, exec.ns, and geo.cidr.Romania.ns. The extension ".ns" in each indicates that it is a named set.

Table 1 shows a group of alternative free email domains. When the named set freemail_common_doms.ns is used in an FSL statement or rule set, it is interpreted as using any of the alternative terms identified in the group.

TABLE 1

| freemail_common_doms.ns |
| --- |
| gmail.com |
| yahoo.com |
| icloud.com |
| me.com |
| mac.com |
| everyone.net |
| hotmail.com |
| aol.com |
| yahoo.com.br |
| mail.ru |
| facebook.com |
| yahoo.co.uk |
| comcast.net |
| sbcglobal.net |
| yandex.ru |
| msn.com |
| rambler.ru |

Table 2 shows a group of alternative terms that could be used to identify executive positions in an organization. When the named set exec.ns is used in an FSL statement or rule set, it is interpreted as using any of the alternative terms identified in Table 2.

TABLE 2

| exec.ns |
| --- |
| ceo |
| chief |
| executive |
| officer |
| dr |
| president |
| director |
| iii |
| esq |
| cfo |

Named sets can be used to identify other types of alternative information as well. For example, named sets can also support things like CIDR ranges, as shown in Table 3 below. Table 3 contains a shortened list of CIDR ranges associated with Romanian IP geolocations.

TABLE 3

| geo.cidr.Romania.ns |
|---|
| 185.93.96.0/22 |
| 185.96.160.0/24 |
| 185.96.162.0/23 |
| 185.99.88.0/22 |
| 188.119.128.0/18 |
| 188.173.0.0/16 |
| 188.191.248.0/21 |
| 188.208.0.0/20 |
| 194.1.169.0/24 |
| 194.1.178.0/24 |
| 194.102.128.0/17 |
| 194.102.32.0/19 |
| 194.102.64.0/18 |
| 194.105.0.0/22 |
| 194.105.140.0/22 |

Below is an attribute that was derived from a reply-to header using various namedsets:

```
# express attributes whenever reply-to domains are found in
    freemail_doms, but not in freemail_common_doms
SET header_reply-to_with_uncommon_freemail_dom
TO EXPRESS <ns>/header-reply-to-dom-at-uncommon-freemail/:true
WHERE core <ns>/header-reply-to-domain/:
  IsValInSet(namedset=freemail_common_doms, filter, not)
  IsValInSet(namedset=freemail_doms)
```

Here, the reply-to domain is first filtered through "freemail_common_domains" set to eliminate common freemail domains, then checked for membership in the "freemail_doms" set.

Input header "Reply-to: attacker@gmx.com" results in attribute:

rfc822/header-reply-to-dom-at-uncommon-freemail/:true

This is because "gmx.com" is NOT in the "freemail_common_doms" set but IS in "freemail_doms".

Here's another example, using CIDR namedsets where the input is found in multiple sets which results in multiple attributes being expressed.

Figure 8:
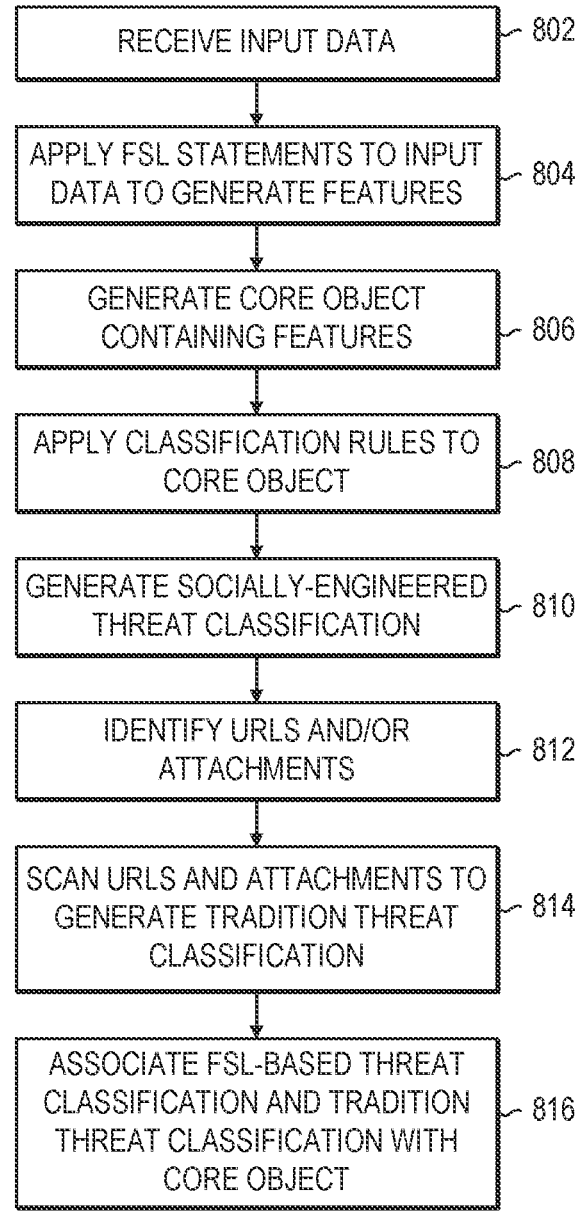
FIG. 8 is a flow diagram illustrating an exemplary method for generating a composite classification of input data in accordance with some embodiments.

```
# create attributes when a Received: header contains an IPv4 address in a
network of interest
SET header-received-ipv4-in-noi
WHERE core <ns>/header-received-ipv4/:
    IsIPInCIDRSet(namedset='geo.cidr.attacker_networks,geo.cidr.ESP,ge
    o.cidr.home_ISP,geo.cidr.vpn_proxy,geo.cidr.Romania')
Input header: "Received:from host.xyz (unknown [37.120.239.170]) by
    out.host.xyz (Postfix) with ESMTPA id F39395X4E81 for
    <bob@inbound.edu>; Fri, 11 Feb 2022 15:40:46 +0000 (UTC)"
``` results in the attributes (the 37.120.239.170 IP is found to be a member of multiple namedsets):

rfc822/header-received-ipv4-is-in/:geo.cidr.Romania
rfc822/header-received-ipv4-is-in/:geo.cidr.attacker_networks
rfc822/header-received-ipv4-is-in/:geo.cidr.vpn_proxy Referring to FIG. 8, a flow diagram illustrating an exemplary method for generating a composite classification of input data in accordance with some embodiments is shown. In this embodiment, input content is received by the FSL-based threat identification system (step 802). The system retrieves the FSL statements from the FSL database and applies the functions defined by the statements to the input data (step 804). The features generated by application of the FSL statements to the input data are aggregated in a core object corresponding to the input data (step 806). The system's classifier engine then retrieves the classification rule sent from the rules database and applies these rules to the features in the core object (step 808). Based on the application of the classification rules, the system generates a threat classification for the core object (and corresponding input data) (step 810). The system additionally identifies URLs and/or attachments to the input data (step 812) and scans these URLs and/or attachments using traditional techniques to generate a separate URL/attachment-based threat classification (step 814). The classifications generated for the core object, including the FSL-based classification and the URL/attachment-based classification, are both associated with the core object to create a composite classification for the object (step 816).

As an alternative to generating separate classifications that are combined in the core object, the system may generate threat classification information based on the URLs and/or attachments using traditional techniques, and may then process the generated threat classification information in the same manner as the input data. In other words, the FSL statements are applied to the information to generate corresponding features, and the classification rules are applied to these features to identify thematic threats in the conventionally generated classification information. The results of applying the classification rules to the features of this information may be added to the non-URL, non-attachment classification of the core object, or the threat classifications based on the textual input data and the URLs/attachments can be combined into a single, composite classification which is stored with the core object.

Embodiments of the technology may be implemented on a computing system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer systems may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages), a server program configured to extend the functionality of the page processing program or other server code. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered. Application server code can be executable to receive requests from client computers, generate server page files from a set of page assets (e.g., complete web pages, page fragments, scripts or other assets) and return page files in response. A page file may reference additional resources, such as style sheets, images, videos, audio, scripts or other resources at a server computer system or at other network locations, such as at additional server systems.

According to some embodiments, a network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for identification of threats in input content, the system comprising:

a processor;

a non-transitory computer-readable medium; and stored instructions translatable by the processor to:

storing, in a feature syntax language (FSL) statement database, statements that define a plurality of functions, each function adapted to generate a corresponding feature responsive to detecting corresponding text in a content item;

receiving, by a core object generator, an input content item;

applying, by the core object generator, the functions stored in the FSL statement database to the input content item;

generating, by the core object generator, a set of features resulting from application of the functions stored in the FSL statement database to the input content item, the set of features corresponding to the input content item;

generating, by the core object generator, a core object containing the set of features corresponding to the input content item;

receiving, by a classifier engine, the core object from the core object generator;

retrieving, by the classifier engine, one or more rules from a rules database;

applying, by the classifier engine, the one or more rules to the received core object and thereby providing real-time identification of threats corresponding to the core object according to the applied one or more rules;

receiving, by a user interface coupled to the FSL statement database and the rules database, user input to modify the statements in the FSL statement database and the rules in the rules database, the system using the modified statements and rules in real-time;

receiving, by a user interface coupled to the FSL statement database and the rules database, user input to modify the statements in the FSL statement database and the rules in the rules database, the system using the modified statements and rules in real-time;

storing one or more named sets, each named set containing a set of alternative terms, the one or more named sets being included in at least one of: statements in the FSL statement database, and the rules in the rules database.

2. The system of claim 1, wherein the user interface is adapted to update the FSL statement database based on the received user input in real-time, and wherein the core object generator is adapted to apply the functions of the updated FSL statement database in real-time.

3. The system of claim 2, wherein updating the FSL statement database comprises adding one or more statements to the FSL statement database, each of the added statements defining a corresponding added function, each added function corresponding to an additional feature.

4. The system of claim 1, wherein the core object generator is adapted to receive a plurality of different content item types, the core object generated by the core object generator being type-agnostic.

5. The system of claim 1, wherein the user interface is coupled to the rules database, the rules database being updated in real-time based on rules input received via the user interface, and wherein the classifier engine is adapted to apply the updated rules in real-time to the received core object.

6. The system of claim 1, wherein the classifier engine comprises a match engine adapted to compare the set of features of the core object to the retrieved one or more rules and to identify matches between the set of features and the one or more rules.

7. The system of claim 6, wherein the match engine is adapted to generate a list of the one or more rules that match the core object.

8. The system of claim 7, wherein the match engine is coupled to a category precedence ordering module which defines precedence of a plurality of threat categories, the match engine ordering the list of the one or more rules that match the core object according to the defined precedence of the plurality of threat categories.

9. The system of claim 8, the classifier engine providing as output a labeled core object containing the core object and the ordered list of the one or more rules that match the core object.

10. The system of claim 9, further comprising a core object database, the core object database storing the labeled core object.

11. The system of claim 1, further comprising a core object database, the core object database storing the generated core object.

12. The system of claim 1, wherein the user interface is adapted to receive user input modifying one or more of the named sets, the system using the modified named sets in real-time.

13. The system of claim 1, wherein the classifier engine is adapted to identify threats comprising thematic attacks, the thematic attacks being identified independent of attachments and URLs associated with the input content item.

14. The system of claim 13, wherein the classifier engine is adapted to identify a specific theme associated with the input content item.

15. The system of claim 1: wherein the classifier engine is adapted to generate a thematic classification and to associate the thematic classification with the core object; and wherein the system is adapted to perform an analysis of one or more of: an attachment to the input content item; and a URL contained in the input content item, wherein the system generates a second classification based on the analysis.

16. A method comprising:
storing, in a feature syntax language (FSL) statement database, statements that define a plurality of functions, each function adapted to generate a corresponding feature responsive to detecting corresponding text in a content item;

receiving, by a core object generator, an input content item;

applying, by the core object generator, the functions stored in the FSL statement database to the input content item;

generating, by the core object generator, a set of features resulting from application of the functions stored in the FSL statement database to the input content item, the set of features corresponding to the input content item;

generating, by the core object generator, a core object containing the set of features corresponding to the input content item;

receiving, by a classifier engine, the core object from the core object generator;

retrieving, by the classifier engine, one or more rules from a rules database;

applying, by the classifier engine, the one or more rules to the received core object and thereby providing real-time identification of threats corresponding to the core object according to the applied one or more rules; and storing one or more named sets, each named set containing a set of alternative terms, the one or more named sets being included in at least one of: statements in the FSL statement database, and the rules in the rules database.

17. The method of claim 16, further comprising:
receiving, by a user interface coupled to the FSL statement database and the rules database, user input to modify the statements in the FSL statement database and the rules in the rules database; and applying, by the core object generator and the classifier engine, the modified statements and rules in real-time.

18. The method of claim 16, further comprising updating, by the user interface, the FSL statement database based on the received user input in real-time, and applying, by the core object generator, the functions of the updated FSL statement database in real-time.

19. The method of claim 16, further comprising:
updating, by the user interface, the rules database in real-time based on rules input received via the user interface, and
applying, by the classifier engine, the updated rules in real-time to the received core object.

20. The method of claim 16, further comprising:
receiving, by the user interface, user input modifying one or more of the named sets, and using the modified named sets in real-time.

* * * * *